United States Patent
Spiro

(10) Patent No.: US 11,622,510 B2
(45) Date of Patent: Apr. 11, 2023

(54) AUTOMATED VERTICAL PLANT CULTIVATION SYSTEM

(71) Applicant: Urban Planter LLC, Scottsdale, AZ (US)

(72) Inventor: Daniel S. Spiro, Scottsdale, AZ (US)

(73) Assignee: URBAN PLANTER, LLC, Scottsdale, AZ (US)

( * ) Notice: Subject to any disclaimer, the term of this patent is extended or adjusted under 35 U.S.C. 154(b) by 222 days.

(21) Appl. No.: 16/914,001

(22) Filed: Jun. 26, 2020

(65) Prior Publication Data

US 2020/0323151 A1     Oct. 15, 2020

Related U.S. Application Data

(63) Continuation-in-part of application No. 15/973,212, filed on May 7, 2018, now Pat. No. 11,129,339, (Continued)

(51) Int. Cl.
*A01G 9/02* (2018.01)
*A01G 27/00* (2006.01)
(Continued)

(52) U.S. Cl.
CPC .......... *A01G 9/023* (2013.01); *A01G 9/0293* (2018.02); *A01G 9/247* (2013.01); *A01G 9/249* (2019.05);
(Continued)

(58) Field of Classification Search
CPC .... A01G 9/0297; A01G 9/0295; A01G 29/00; A01G 31/06; A01G 9/0293; A01G 9/023
See application file for complete search history.

(56) References Cited

U.S. PATENT DOCUMENTS

| 1,560,436 A | 11/1925 | Staples |
| 1,974,068 A | 9/1934 | Greensaft |

(Continued)

FOREIGN PATENT DOCUMENTS

| CA | 2859165 | 6/2013 |
| CN | 103416292 | 12/2013 |

(Continued)

OTHER PUBLICATIONS

Spiro, Daniel, "Automated Vertical Plant Cultivation System," EP Application No. 19214341.0, Extended European Search Report dated May 6, 2020.

(Continued)

*Primary Examiner* — Monica L Perry
(74) *Attorney, Agent, or Firm* — Xsensus LLP

(57) ABSTRACT

An automated plant cultivation system is provided having multi-tiered vertically arranged horizontal magazine structures each employing seed or plant capsules with a fluid circulation and illumination and communication network controlled by an on-board processor. Particularly, the system includes a magazine structure having seed/plant capsules within seed/plant reservoirs alternately arranged between at least one of a light source substantially concealed from direct viewing. A fluid channel extends across a long axis of the magazine structure, wherein the magazine structure is adapted for use of seed/plant capsules with nutrient composite plant growth cultivation, hydroponic plant growth cultivation, aeroponic plant growth cultivation methods or combinations thereof.

15 Claims, 12 Drawing Sheets

Related U.S. Application Data which is a continuation-in-part of application No. 15/885,157, filed on Jan. 31, 2018, now Pat. No. 11,304,390, which is a continuation-in-part of application No. 15/589,845, filed on May 8, 2017, now Pat. No. 10,524,433.

(51) Int. Cl.
*A01G 31/06* (2006.01)
*A01G 9/24* (2006.01)
*A01G 9/029* (2018.01)
A01G 29/00 (2006.01)
A01G 31/00 (2018.01)

(52) U.S. Cl.
CPC ......... *A01G 27/001* (2013.01); *A01G 27/003* (2013.01); *A01G 31/06* (2013.01); A01G 29/00 (2013.01); A01G 2031/006 (2013.01)

(56) References Cited

U.S. PATENT DOCUMENTS

| | | |
|---|---|---|
| 2,723,341 A | 11/1955 | Greenspan |
| 3,030,735 A | 4/1962 | Bodkins |
| 3,314,192 A | 4/1967 | Park |
| 3,950,637 A | 4/1976 | Rodin |
| D243,906 S | 4/1977 | Ware |
| 4,170,844 A | 10/1979 | Steele |
| 4,295,296 A | 10/1981 | Kinghorn |
| 4,626,968 A | 12/1986 | Von Kohorn |
| 4,845,602 A | 7/1989 | Lehocki |
| 5,454,187 A | 10/1995 | Wasserman |
| 5,524,387 A | 6/1996 | Whisenant |
| 5,826,375 A | 10/1998 | Black |
| 6,061,957 A | 5/2000 | Takashima |
| 6,076,940 A | 6/2000 | Sanford |
| 6,105,309 A | 8/2000 | Takayanagi |
| 6,134,832 A | 10/2000 | Bokmiller et al. |
| 6,536,159 B1 | 3/2003 | Van Den Ende |
| 7,997,429 B2 | 8/2011 | Anker |
| 8,549,788 B2 | 10/2013 | Bryan, III |
| 8,864,331 B2 | 10/2014 | Kalb |
| 9,775,330 B1 | 10/2017 | Chen |
| 9,974,252 B2 | 5/2018 | Aykroyd et al. |
| 10,736,275 B2 | 8/2020 | Lopez |
| 2003/0145519 A1 | 8/2003 | Winsbury |
| 2004/0110279 A1 | 6/2004 | Everett |
| 2004/0118701 A1 | 6/2004 | Senkiw |
| 2007/0104841 A1 | 5/2007 | Min |
| 2007/0199241 A1 | 8/2007 | Peleszezak |
| 2008/0092442 A1 | 4/2008 | Singer |
| 2008/0222949 A1 | 9/2008 | Bissonnette |
| 2008/0251483 A1 | 10/2008 | Davis |
| 2010/0037517 A1 | 2/2010 | Copping et al. |
| 2010/0115837 A1 | 5/2010 | Van |
| 2010/0141156 A1 | 6/2010 | Canino et al. |
| 2010/0146854 A1 | 6/2010 | Cannon |
| 2011/0000807 A1 | 1/2011 | Snelten |
| 2011/0219689 A1 | 9/2011 | Hodson-Walker |
| 2011/0258927 A1 | 10/2011 | Carter |
| 2012/0000128 A1 | 1/2012 | Rochefort |
| 2012/0019382 A1 | 1/2012 | Kohler et al. |
| 2012/0054061 A1 | 3/2012 | Fok |
| 2012/0144740 A1 | 6/2012 | Igarashi |
| 2012/0260569 A1 | 10/2012 | Golgotiu |
| 2013/0074408 A1 | 3/2013 | Singh |
| 2013/0255146 A1 | 10/2013 | Lehman |
| 2013/0294065 A1 | 11/2013 | Wells |
| 2013/0298461 A1 | 11/2013 | Shih |
| 2014/0000162 A1 | 1/2014 | Blank |
| 2014/0026482 A1 | 1/2014 | Nell |
| 2014/0115958 A1 | 5/2014 | Helene |
| 2014/0208642 A1 | 7/2014 | Henman et al. |
| 2014/0230326 A1 | 8/2014 | Wilson et al. |
| 2014/0318012 A1 | 10/2014 | Fujiyama |
| 2015/0000191 A1 | 1/2015 | Nagadome |
| 2015/0223402 A1 | 8/2015 | Krijn |
| 2015/0223418 A1 | 8/2015 | Collins et al. |
| 2015/0230409 A1 | 8/2015 | Nicole |
| 2015/0237811 A1 | 8/2015 | Marquez |
| 2016/0014974 A1 | 1/2016 | Grajcar |
| 2016/0037737 A1 | 2/2016 | Fingerle |
| 2016/0128288 A1 | 5/2016 | Pettinelli |
| 2016/0135395 A1 | 5/2016 | Umpstead |
| 2016/0183488 A1 | 6/2016 | Yano |
| 2016/0192606 A1 | 7/2016 | Karbowski |
| 2016/0205739 A1 | 7/2016 | Grajcar |
| 2016/0262324 A1 | 9/2016 | Yamane |
| 2016/0316645 A1 | 11/2016 | Neufeld |
| 2016/0316646 A1 | 11/2016 | Lepp |
| 2016/0345518 A1 | 12/2016 | Collier |
| 2016/0360712 A1 | 12/2016 | Yorio |
| 2017/0071143 A1 | 3/2017 | Newsam |
| 2017/0079223 A1 | 3/2017 | Cheng |
| 2017/0105372 A1 | 4/2017 | Bryan, III |
| 2017/0202156 A1 | 7/2017 | Harms |
| 2017/0202164 A1 | 7/2017 | Dufresne |
| 2017/0223910 A1 | 8/2017 | Grossman |
| 2017/0258010 A1 | 9/2017 | Nakaminami |
| 2018/0042191 A1 | 2/2018 | Blackburn |
| 2018/0042192 A1 | 2/2018 | Volpe |
| 2018/0077884 A1 | 3/2018 | Barker |
| 2018/0103599 A1 | 4/2018 | Zhan |
| 2018/0168108 A1 | 6/2018 | Foreman |
| 2019/0124854 A1 | 5/2019 | York |
| 2019/0246584 A1 | 8/2019 | Hsueh |
| 2021/0392834 A1* | 12/2021 | Rouxel ................. A01G 9/023 |

FOREIGN PATENT DOCUMENTS

| | | |
|---|---|---|
| CN | 104584924 | 5/2015 |
| FR | 2322573 | 4/1977 |
| GB | 201715204 | 11/2017 |
| JP | 2016539662 | 12/2016 |
| KR | 20120015684 | 2/2012 |
| KR | 20120042304 | 5/2012 |
| WO | WO 2015/072076 | 5/2015 |
| WO | WO 2015/140493 | 9/2015 |
| WO | WO 2016/027409 | 2/2016 |
| WO | WO 2017/024353 | 2/2017 |

OTHER PUBLICATIONS

Non-Final Office Action in U.S. Appl. No. 16/672,160 dated Nov. 17, 2021 (37 pages).

* cited by examiner

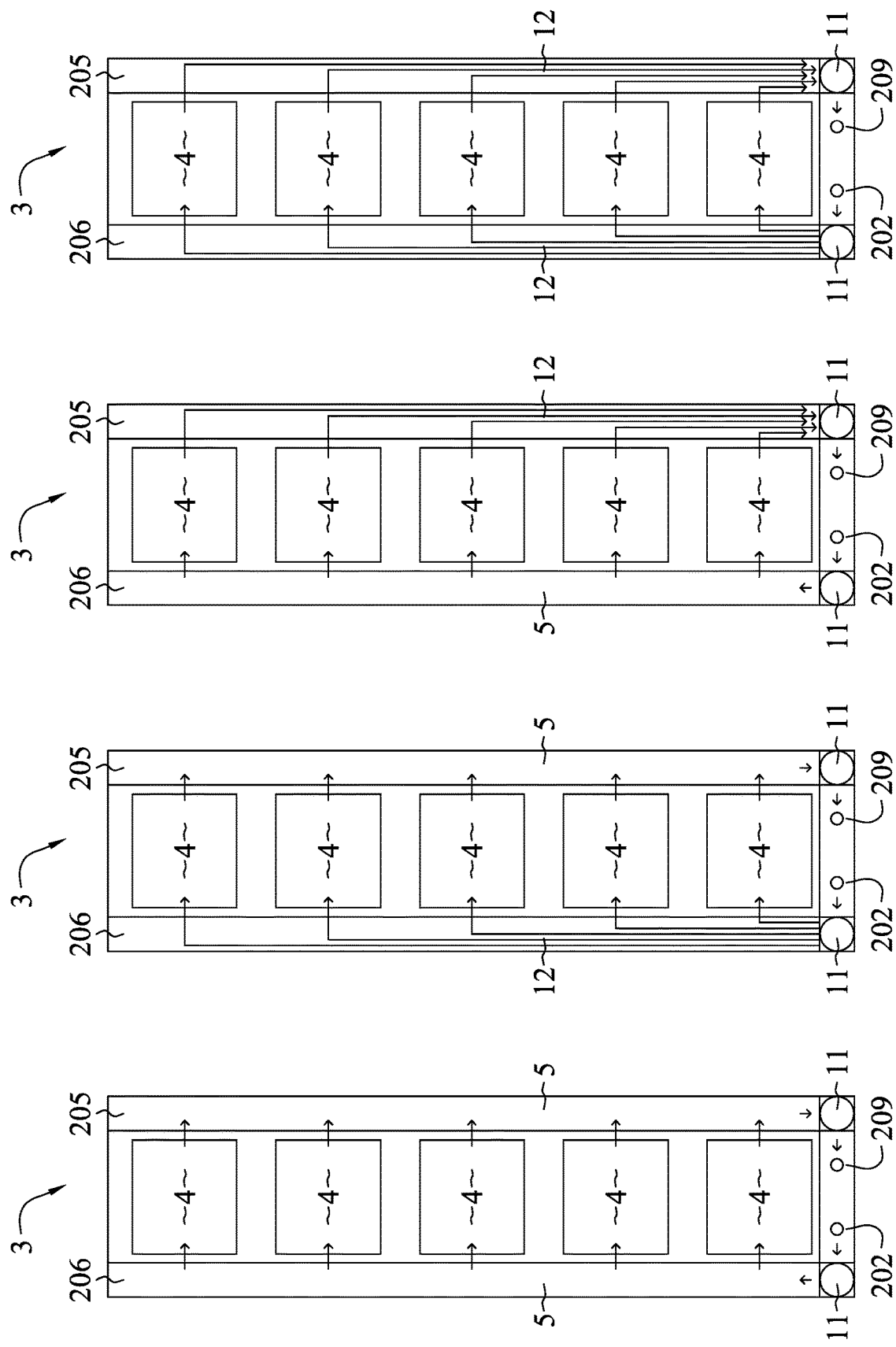

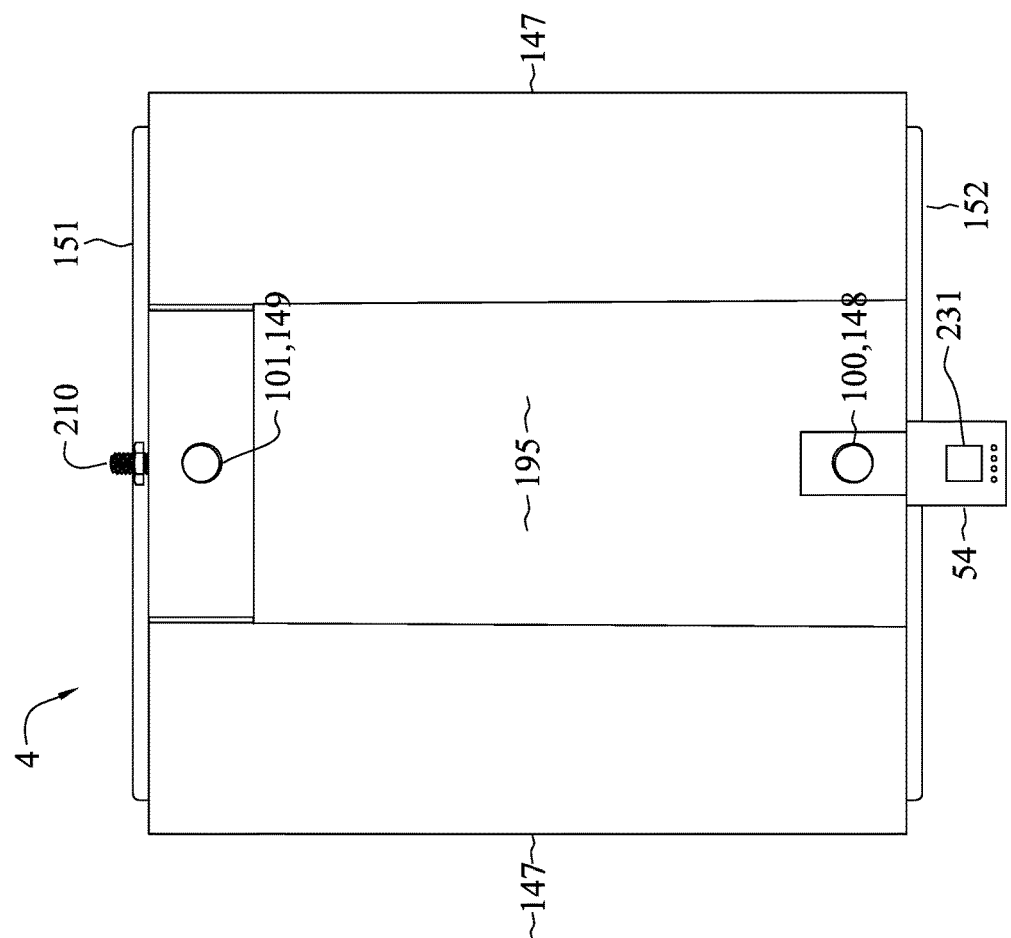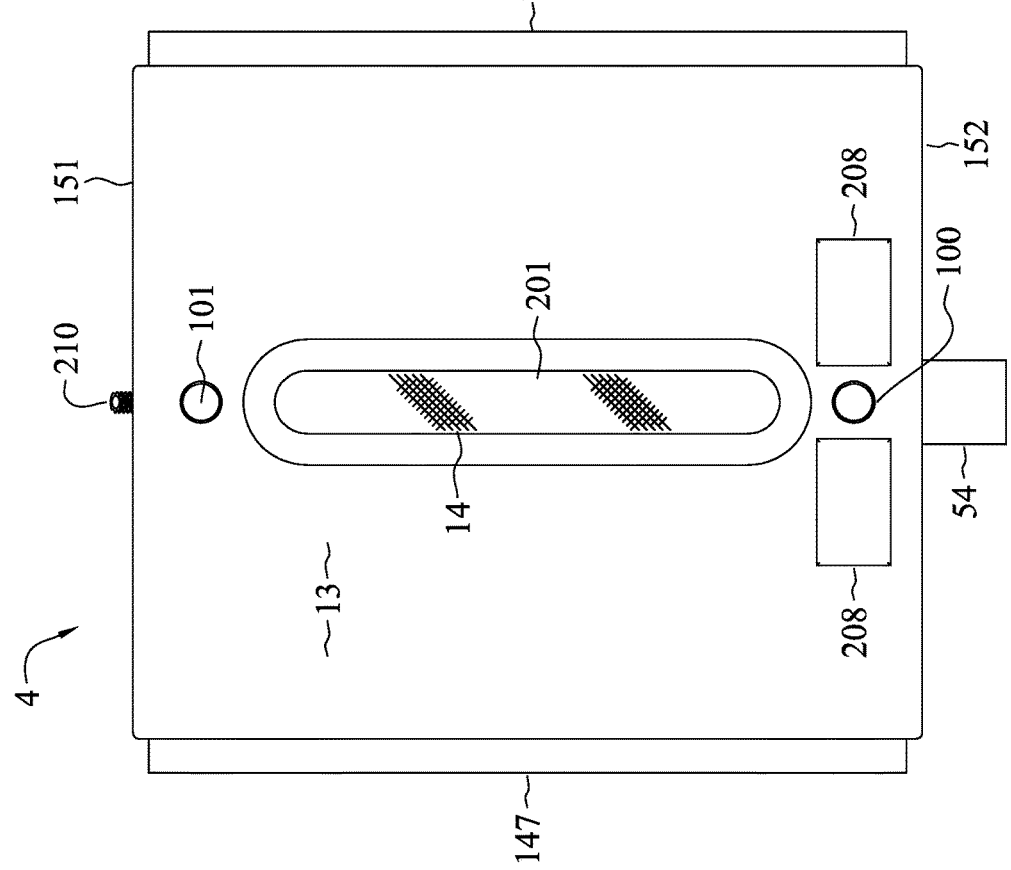

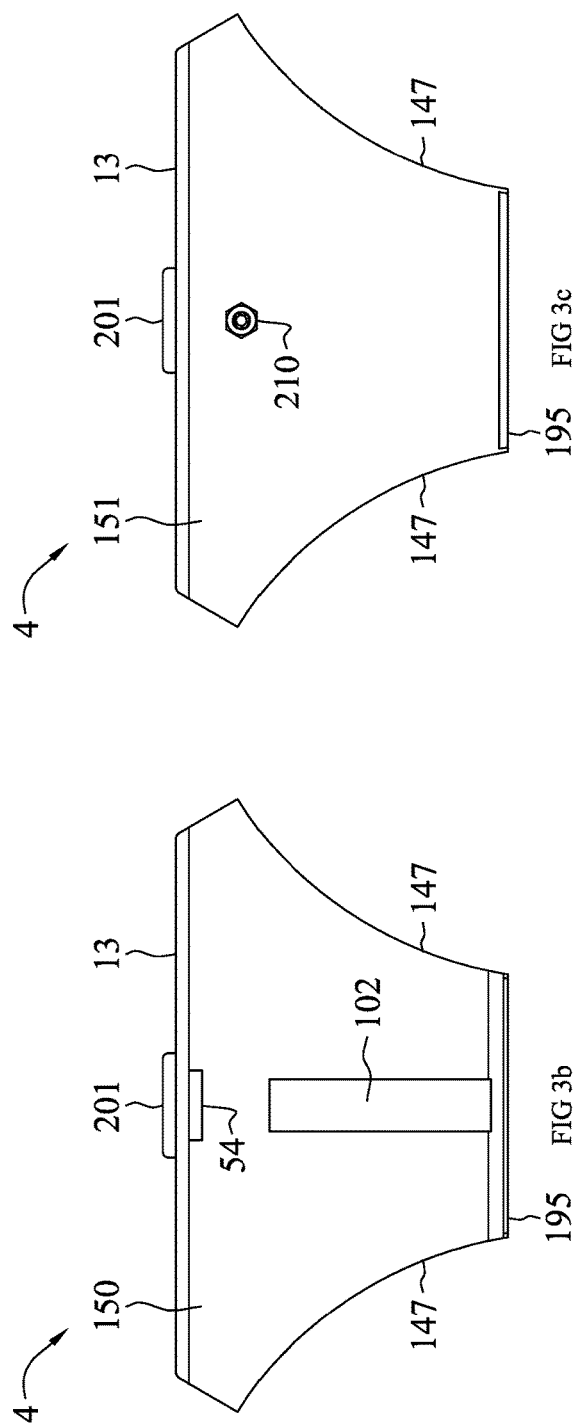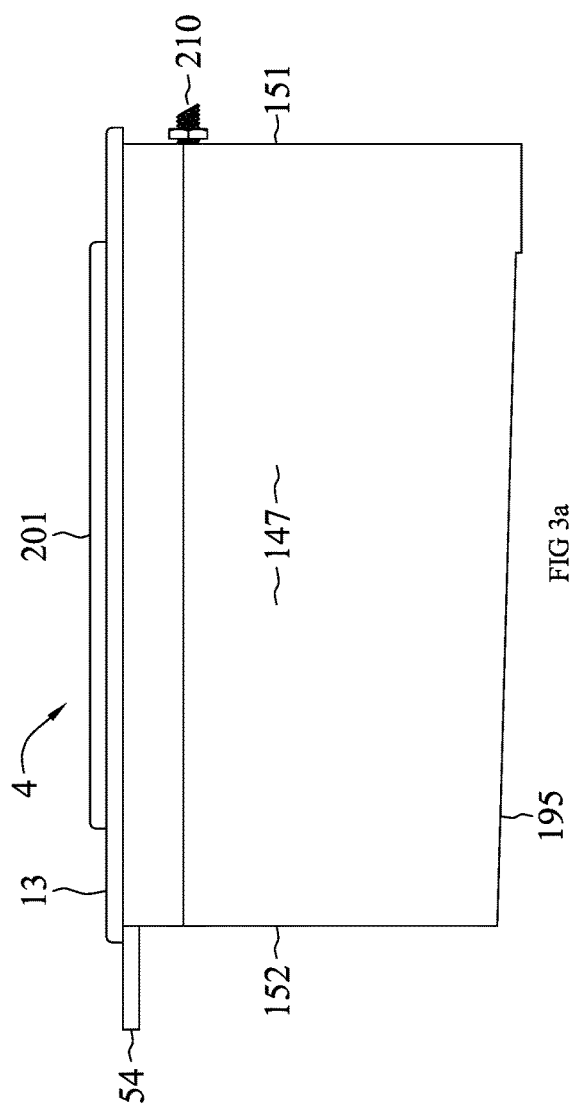

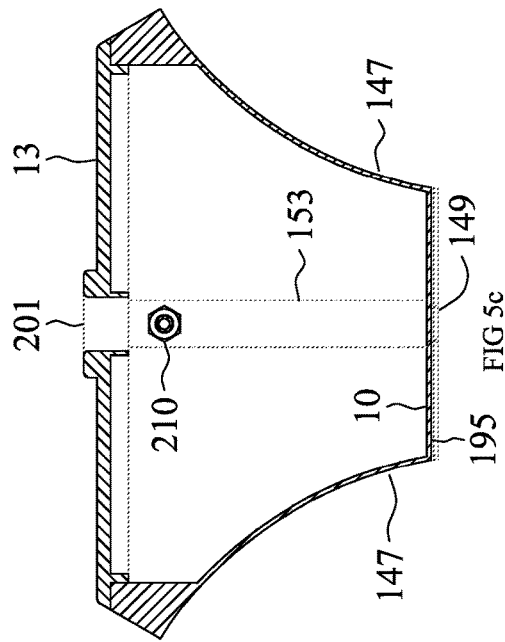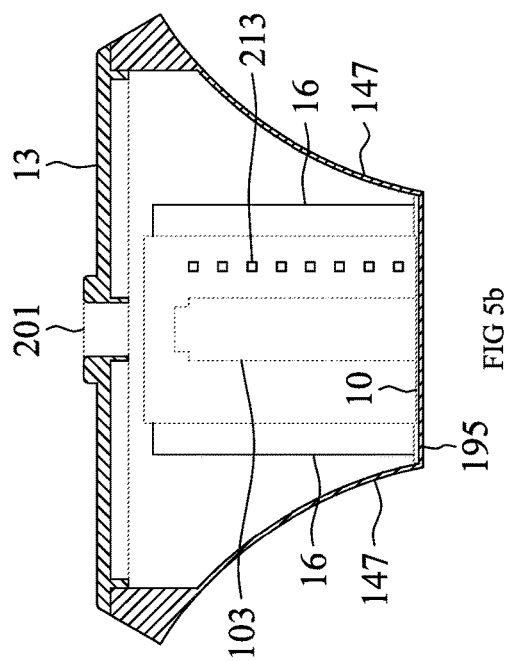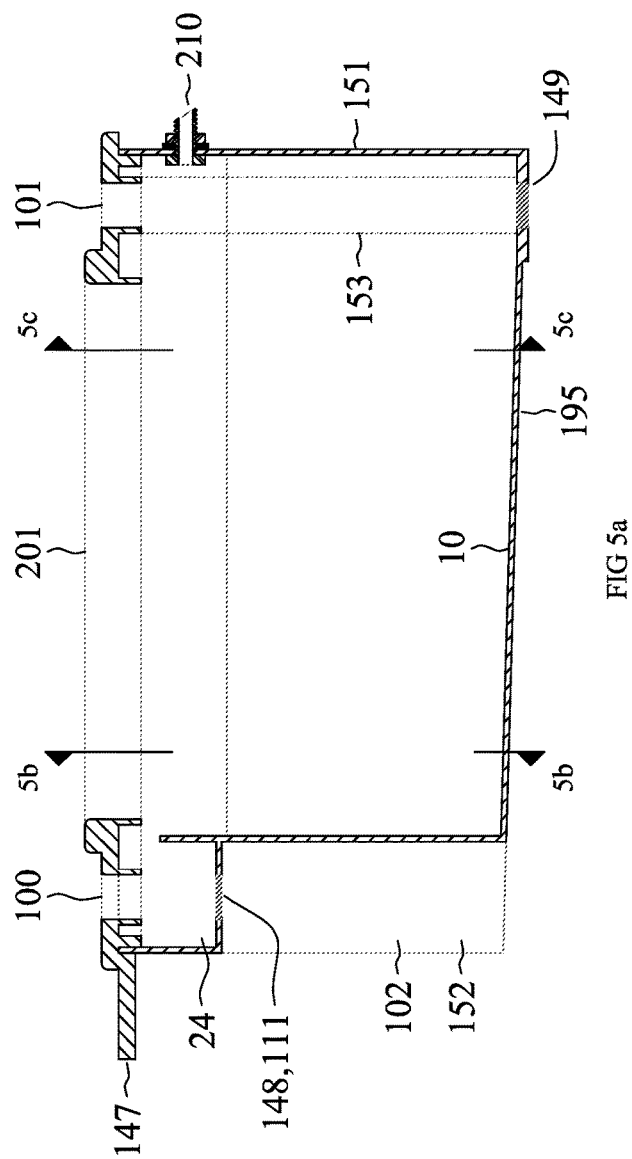

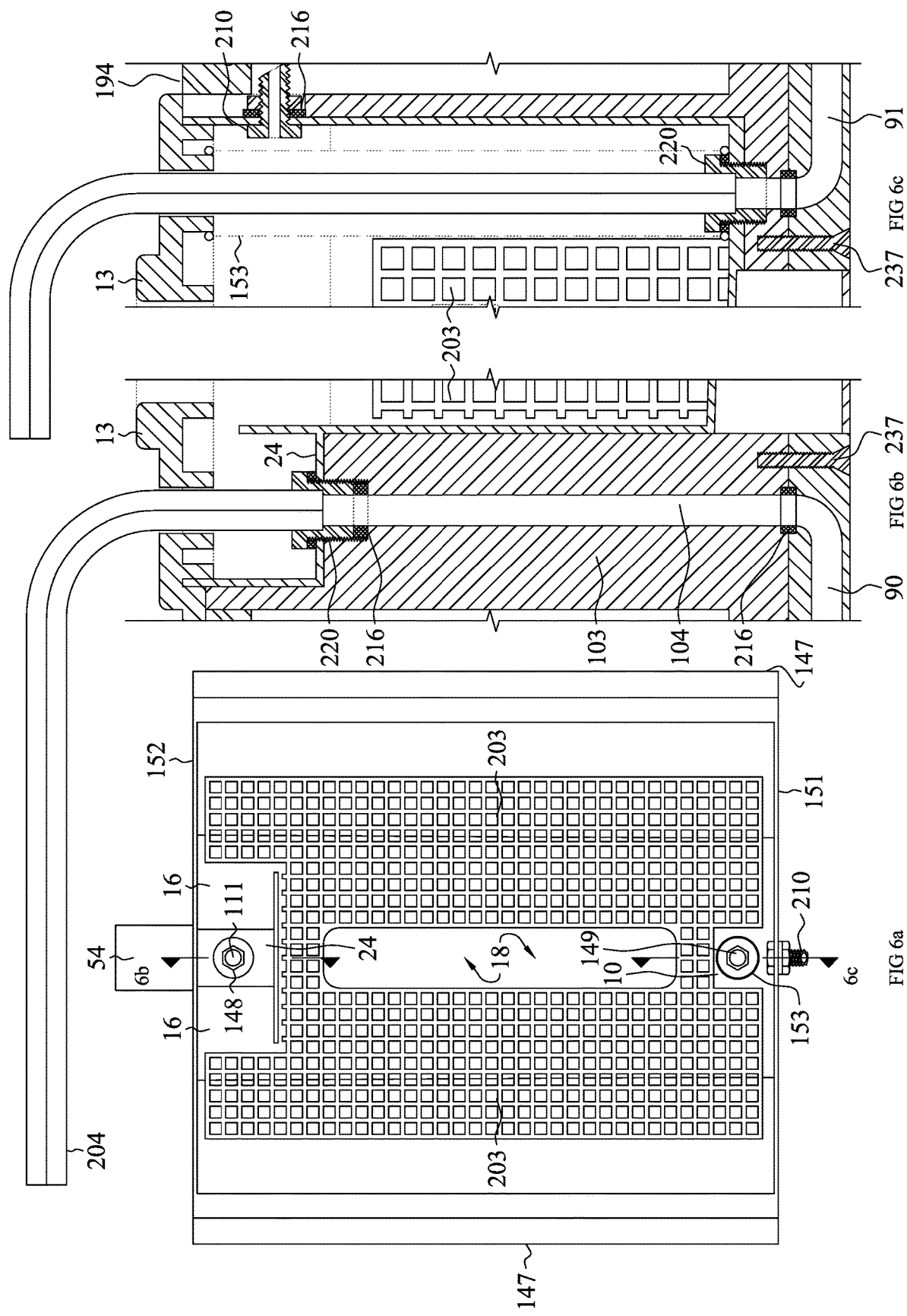

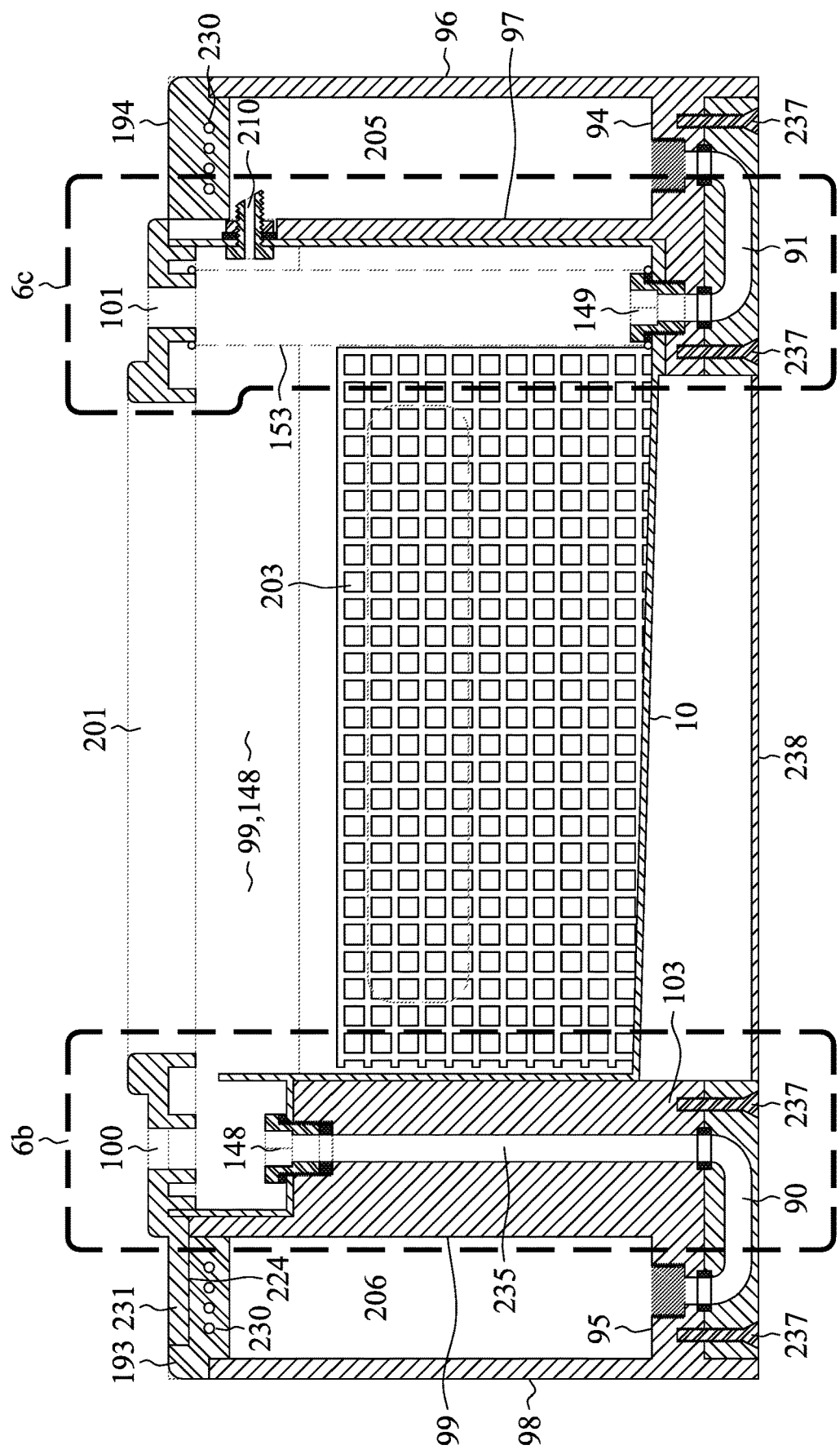

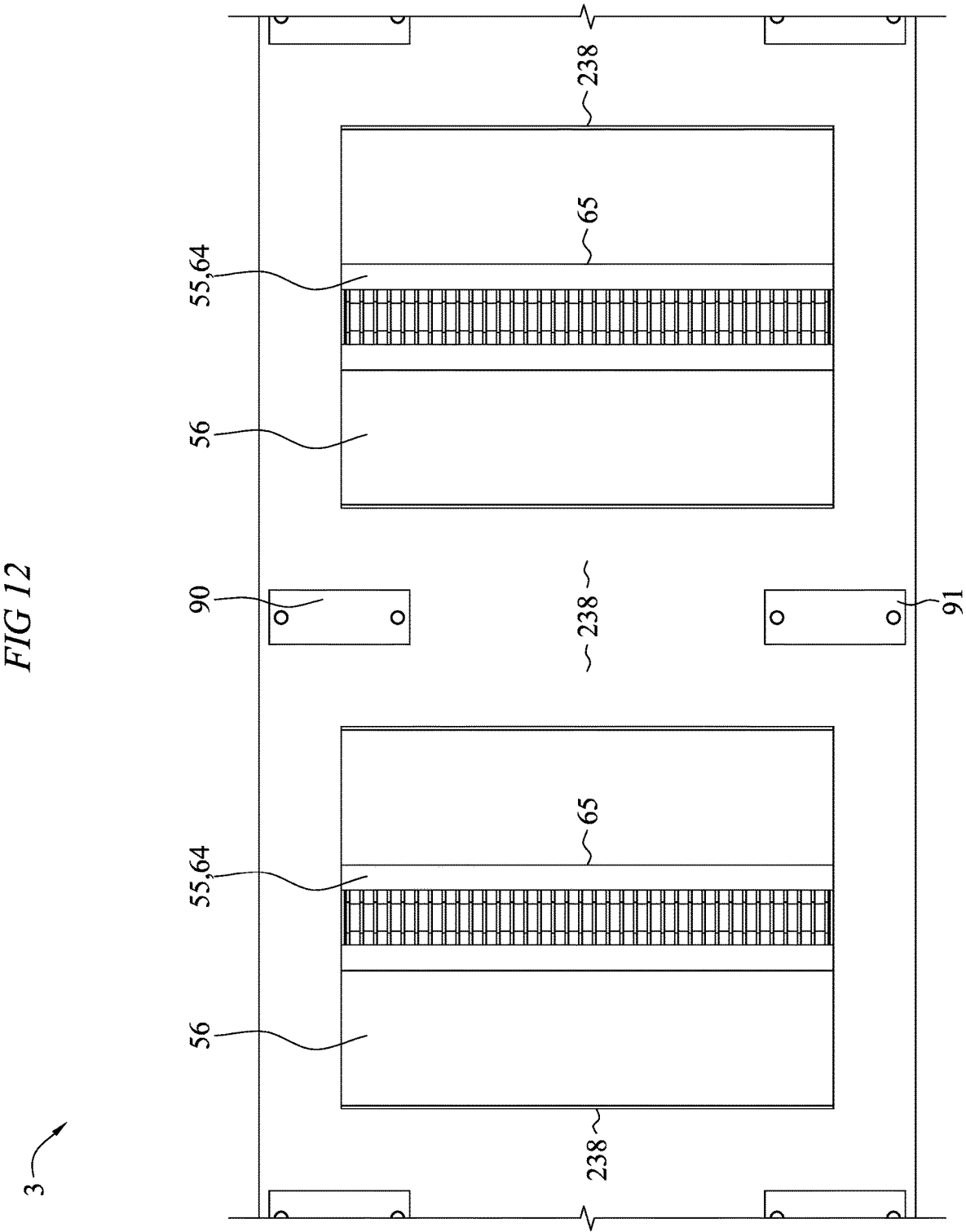

AUTOMATED VERTICAL PLANT CULTIVATION SYSTEM

CROSS REFERENCE TO RELATED APPLICATION[S]

This application is a continuation-in-part of the earlier U.S. Utility patent Ser. No. 15/973,212, filed May 7, 2018, which is a continuation-in-part of the earlier U.S. Utility patent Ser. No. 15/885,157, filed Jan. 31, 2018, which is a continuation-in-part of the earlier U.S. Utility patent Ser. No. 15/589,845, filed May 8, 2017, and U.S. Utility patent Ser. No. 15/885,157 also claims priority to U.S. Provisional Patent Application Ser. No. 62/592,246, filed Nov. 29, 2017, the disclosures of which are hereby incorporated entirely herein by reference.

BACKGROUND OF THE INVENTION

Technical Field

This invention relates generally to a plant cultivation system and more particularly an automated plant cultivation system having multi-tiered vertically arranged horizontal structures each employing seed or plant capsules with a fluid circulation, illumination and communication network controlled by an on-board processor.

State of the Art

In urban environments, smart space utilization is key to reducing home and office costs. The 21st century electronic technologies have had a profound impact on design concepts applied to furniture/appliance placement in interiors. Present day interior electronic devices are slimline, compact, multifunctional and network designed to optimize floor and wall space. Device connectivity via the internet results in less dependency on printed material, further clearing floor and wall space previously taken up by bookcases.

As technological advances have changed design practices, indoor appliances and furniture, they have also isolated us from nature. While outdoor garden and parks are common in urban environments, a feature appreciated by all, indoor space for gardens in urban settings has thus far been the privilege of only the wealthy. The advent of the internet of things ("IoT") governed by resident intelligence now makes indoor horticulture affordable to all. Historic technological obstacles which stood in the way of home and office plant cultivation, including soil, moisture, lighting, insects, fungi, molds, algae, and odor control, have been overcome. Now, technology has made indoor plant cultivation not only possible, but also affordable for most people.

DISCLOSURE OF THE INVENTION

The present invention relates to an automated plant cultivation system having multi-tiered vertically arranged horizontal structures each employing seed or plant capsules with a fluid circulation and illumination and communication network controlled by an on-board processor.

An embodiment includes an automated vertical plant cultivation system comprising: a magazine structure for plant cultivation comprising: at least one fluid channel; a light source with a reflector aperture substantially concealing the light source from direct view; and at least two seed/plant reservoirs, each seed/plant reservoir retaining a seed/plant capsule, wherein the fluid channel extends across the light source aperture and each seed/plant reservoir allowing fluid into said reservoirs.

Another embodiment includes an automated vertical plant cultivation system comprising a magazine structure having: seed/plant capsules within seed/plant reservoirs alternately arranged between at least one of a light source substantially concealed from direct viewing; a fluid channel extend across a long axis of the magazine structure, wherein the magazine structure is adapted for use of seed/plant capsules with nutrient composite plant growth cultivation, hydroponic plant growth cultivation, aeroponic plant growth cultivation methods or combinations thereof.

Further, another embodiment includes an automated vertical plant cultivation system comprising: a magazine structure comprising: at least one seed/plant capsule fluid reservoir; a fluid channel; and a light source, wherein the seed/plant reservoir has an inner wall for containing fluid and an outer wall that is a light reflector.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1A is a diagrammatic view of fluid delivery to capsules of an automated vertical plant cultivation system, in accordance with embodiments;

FIG. 1B is a diagrammatic view of fluid delivery to capsules of an automated vertical plant cultivation system, in accordance with embodiments;

FIG. 1C is a diagrammatic view of fluid delivery to capsules of an automated vertical plant cultivation system, in accordance with embodiments;

FIG. 1D is a diagrammatic view of fluid delivery to capsules of an automated vertical plant cultivation system, in accordance with embodiments;

FIG. 2A is a top view of a seed/plant capsule of an automated vertical plant cultivation system, in accordance with embodiments;

FIG. 2B is a bottom view of a seed/plant capsule of an automated vertical plant cultivation system, in accordance with embodiments;

FIG. 3A is a side elevation view of a seed/plant capsule of an automated vertical plant cultivation system, in accordance with embodiments;

FIG. 3B is an end elevation view of a supply side of a seed/plant capsule of an automated vertical plant cultivation system, in accordance with embodiments;

FIG. 3C is an end elevation view of an evacuation side of a seed/plant capsule of an automated vertical plant cultivation system, in accordance with embodiments;

FIG. 5A is a section view of a seed/plant capsule of an automated vertical plant cultivation system, in accordance with embodiments;

FIG. 5B is a section view toward a fluid supply side of a seed/plant capsule of an automated vertical plant cultivation system, in accordance with embodiments;

FIG. 5C is a section view toward a fluid evacuation side of a seed/plant capsule of an automated vertical plant cultivation system, in accordance with embodiments;

FIG. 6A is a top view of a seed/plant capsule without a cap for use in an automated vertical plant cultivation system, in accordance with embodiments;

FIG. 6B is a section view of a fluid supply riser of a seed/plant capsule for use in an automated vertical plant cultivation system, in accordance with embodiments;

FIG. 6C is a section view of a fluid evacuation port of a seed/plant capsule for use in an automated vertical plant cultivation system, in accordance with embodiments;

FIG. 7 is a section view of a magazine with a seed/plant capsule of an automated vertical plant cultivation system, in accordance with embodiments;

FIG. 12 is an enlarged partial bottom view of a magazine of an automated vertical plant cultivation system with a concealed light source, in accordance with embodiments.

DETAILED DESCRIPTION OF EMBODIMENTS OF THE INVENTION

Figure 4B:
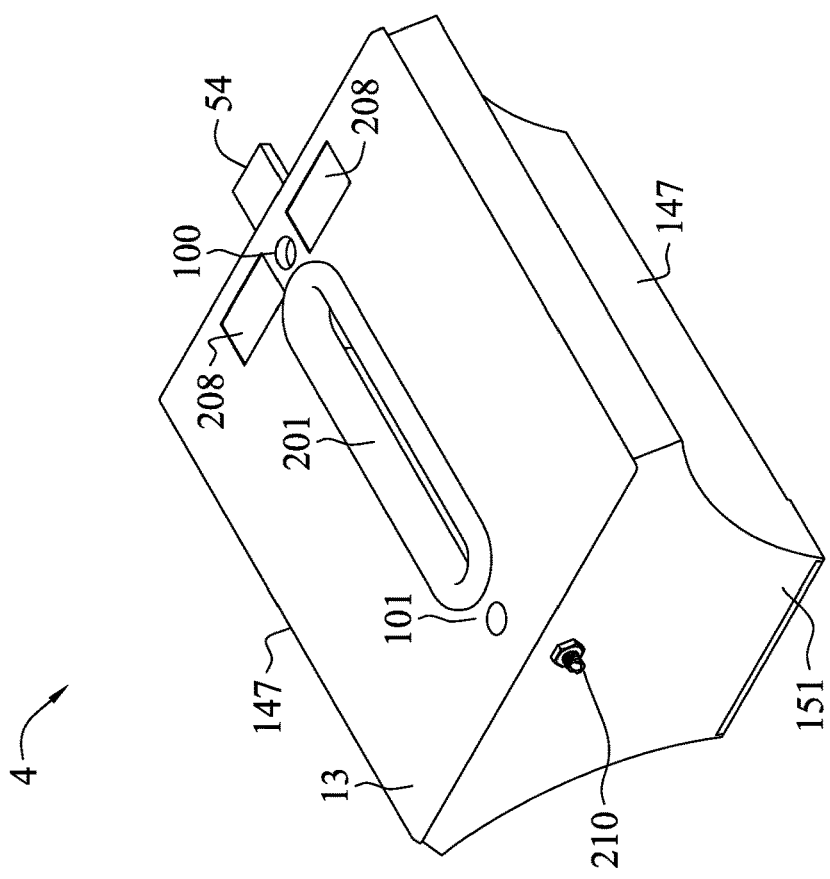
FIG. 4B is a perspective view of an evacuation side of a seed/plant capsule of an automated vertical plant cultivation system, in accordance with embodiments.

As discussed above, embodiments of the present invention relate to an automated plant cultivation system having multi-tiered vertically arranged horizontal structures each employing seed or plant capsules with a fluid circulation and illumination and communication network controlled by an on-board processor.

The automated indoor plant cultivation system shown herein resolves legacy difficulties growing plants anywhere indoors.

The system's two key differentiators from contemporary art are the plant cultivation system's magazine and the seed/plant capsule.

The magazine is a structural truss that conceals an embedded fluid circulatory system, a lighting system, a plurality of seed/plant capsules and a myriad of sensing, communicating, controlling input, output and input and output I.o.T devices.

The seed/plant capsules are nestled inside the magazine's capsule cavity alternately and typically arranged between concealed from direct viewing light sources. Once placed in the cavity, the automated seed/plant growing cycle commences. The capsule typically but not always includes an embedded electronic identifier and/or mechanical key/s. The identifier communicates to the system's processor information about the capsule and its content. The processor having the capsule's information and in accordance with its programing, can operate all magazine capsules uniformly, each magazine individually, or operate each capsule individually providing for each plant material the best growing environment.

Further, this automated indoor plant cultivation system is uniquely capable of cultivating plants employing hydroponics, aeroponics, and soil/mulch-based irrigation methods interchangeably. Aside from employing a fluid compressor in conjunction with operating an aeroponic irrigation method, the cultivation system's architecture and appearance remain unchanged—only the capsule's internal elements are factory pre-configured to operate in accordance with the specific irrigation method.

Capsule Architecture

The capsule is an enclosure designed to contain and facilitate plant material growth. The capsule enclosure material is preferably made of bio-degradable material with either a moisture proof membrane affixed to its wall or a moisture proof wall.

The capsule exterior envelope employs the same form for hydroponic, aeroponic and soil/mulch irrigation methods. The capsule's interior is factory pre-configured to be compatible for the cultivation system's designated irrigation method. The system's fluid supply and evacuation to and from the capsule may vary by the irrigation method. With fluid circulation passages easily accessible, changing the cultivation system from one irrigation system to another can be easily accomplished. Inside the capsule's cavity the capsule is secured to the magazine by employing two fluid through-bolts: one bolt at the capsule's fluid entry spout and the other at the capsule's fluid evacuation spout. The bolts utilizing gaskets protect fluid infiltration beyond the fluid circulatory system. The capsule's evacuation port through-bolt and/or the evacuation channel "U" coupler may employ an apparatus that prevent fluid flow from capsule and/or fluid back-flow from "U" coupler upon removal of the capsule from the magazine.

With some capsules' embodiments, an electronic memory device embedded or attached to the capsule is electrically engaged when the capsule is secured to the magazine. Once engaged, the memory device conveys data about the capsule and its content to the system's processor, which processor may be coupled to the magazine or may be remote from the magazine. The memory device can be wired or wireless.

The memory device may contain information including:

A. Date of manufacturing
B. Plant species contained
C. Seed batch data
D. Seed age
E. Plant growing parameters The capsule memory device may also contain a serial number and self-destruct instruction when the capsule is subject to tampering and/or after a pre-determined time duration. The capsule memory device may self-report upon engagement informing user of capsule not fit for operation due to past storage environment. This protective measure can also be used independently of the memory device by thermal sensitive colored labels affixed to the capsule's exterior bottom surface.

The memory device can be embedded in or affixed to the capsule's electrical receptacle or nearby being located in the vicinity of the supply/return channels caps' electrified conductors. The memory device may have sensing and processing capability reducing the system's component count.

The capsule's long side walls can taper in to precisely sink into the reciprocating counter walls of the magazine's capsule's cavity. The floor of the capsule tapers down from the capsule's fluid supply end wall to the capsule's fluid evacuation end wall.

At the capsule bottom by the fluid evacuation end wall the fluid evacuation port facilitates fluid evacuation from inside the capsule into the fluid evacuation channel. At least one fluid ingress and egress port is employed to deliver fluid to and evacuate fluid from a capsule. The port/s can be mechanically, electrically, gravity operated or combination thereof. An overflow through bolt at the fluid evacuation end wall evacuates fluid from the capsule directly into the fluid evacuation channel in the event that the fluid evacuation port becomes clogged.

The capsule's top is enclosed and sealed with a cap. The cap may have a single or a plurality of openings through which plants grow. The other cap openings are the capsule's supply side mounting opening, evacuation end mounting opening and plant enrichment and health additive/s insertion port and the plant growth aperture/s. The plant growth aperture may have a membrane penetrable by plant shoots. The plant enrichment and health additive/s insertion port may have removable covers. In addition to the functionality of the capsule's supply side mounting opening, in one embodiment employing aeroponic irrigation capsule, the opening may employ an aeroponic connecting bolt to enable pressurized fluid to reach the capsules' misters. The capsules are hermetically sealed in a dry environment at factory after having any live or dormant organism removed from the seeds.

Also, in another embodiment (not shown) the shorter in height capsule is retained in the magazine capsules reservoir and fluid from the supply channel flows directly into the reservoir from below the seed and/or the plant's stem. In this configuration, the fluid of the magazine is controlled by valves and the capsule does not require any special provisions to secure it to the magazine.

Fluid Circulation of Capsule

FIGS. 1A-1D depict four configurations to deliver fluid 5 into the supply channel 206 and remove fluid 5 from the magazine's capsules through the evacuation channel 206. There are two configurations for the supply side and two for the evacuation side. The configurations' figures are shown side by side. FIG. 1A shows all magazine capsules receive and evacuate fluids in unison; FIG. 1B shows each magazine capsule receives fluid individually while fluid is evacuated from all magazine capsules in unison; FIG. 1C shows each magazine capsule receives and evacuate fluid individually; and FIG. 1D shows all magazine capsules receive fluid in unison and evacuate fluid individually.

The fluid enters the magazine 3 from an external supply pipe 202 and evacuates the magazine through the external evacuation/overflow evacuation pipe 209.

The fluid circulation within any magazine 3 is typically controlled by a single or multi-port valve/s 11. The valves may have a capsule 4 dedicated fluid holding chamber. In addition to water, the chamber may receive, retain and mix at least one nutrient, herbicide/pesticide or plant protection substance/s. The valve/s 11 may operate employing low electrical voltage and, in some embodiments, also operate mechanically.

Referring again to the drawings, FIG. 2A shows the top of the seed/plant capsule and FIG. 2B the bottom of the seed/plant capsule.

FIG. 2A shows the seed/plant capsule 4 with a capsule's cap 13 on top. The cap 13 is typically affixed to the capsule's embodiment to form an enclosed vessel with several openings. The openings shown include the supply side capsule's mounting opening 100, the evacuation side capsule's mounting opening 101, the seed/plant growth aperture 201 and the plant nutrition and/or plant additive insertion port/s 208. The mounting opening/s 100, 101 and the insertion port/s 208 may employ secondary caps. The seed/plant growth aperture 201 may be covered by a membrane 14 that permits plant shoots to penetrate through. A tool inserted through the cap mounting opening engage through-bolts (not shown) inside the capsule 4 secures the capsule to the magazine 3 and seal fluid circulation passages between them. The tool is shown in sections FIGS. 6b and 6c. An overhang receptacle 54 extending outwardly from a short side of the cap 13 by fluid supply side wall 152 provides direct or indirect power or power and data connectivity between the capsule 4 and a processor 50. A memory device 231 attached or embedded inside the receptacle 54 or in its vicinity contains information about the capsule 4 and its content. At the evacuation side 151, an overflow through-bolt 210 flows fluid into the evacuation channel 205 when the capsule 4 is flooded.

FIG. 2B shows the bottom of the capsule 4. The capsule's bottom side 195 slopes downwardly from the fluid supply side 150 to the fluid evacuation side 151. The capsule's fluid evacuation port 149 is shown positioned at the center of the capsule's bottom side 195 by the fluid evacuation side 151. From there the long side walls 147 flare up and outwardly. These capsule's walls complement in form the walls of the magazine 3 precisely aligning the magazine's fluid supply and evacuation ports 148, 149 with the capsule 4. Also shown from below is the overhung receptacle 54 extending outwardly from one of the capsule's short sides.

FIGS. 3A-3C depict the capsule's side elevation. FIG. 3A shows the capsule's long elevation; FIG. 3B shows the capsule's short elevation on the fluid supply side; and FIG. 3C shows the capsule's elevation on the fluid evacuation side.

FIG. 3A shows the capsule's embodiment long side with the capsule's cap 13 on top affixed to the enclosure below with the seed/plant aperture 201 located at its center. The side walls are the capsule's long walls 147, taper up and outwardly from the bottom 195. The power or power and data receptacle 54 is shown extending outwardly from the side of the capsule 4.

FIG. 3B shows the supply side of the capsule 4. On top extending toward the viewer at the center of the capsule is the power or power and data overhung receptacle 54. A built-in capsule recess 102 is shown below the receptacle 54. The capsule with its recess slides into the fluid supply riser 103 built into the magazine's supply channel inner wall 99. The capsule 4 side walls flair outwardly from the bottom. These walls when positioned inside the magazine capsule's cavity rest on reciprocating built in magazine walls.

FIG. 3C shows the evacuation side 151 of the capsule 4 with an overflow through-bolt spout 210 extending out from the upper section of the capsule's wall. The capsule's side walls flair outwardly from the bottom. These walls when positioned inside the magazine capsule's cavity rest on reciprocating built in magazine walls.

Figure 4A:
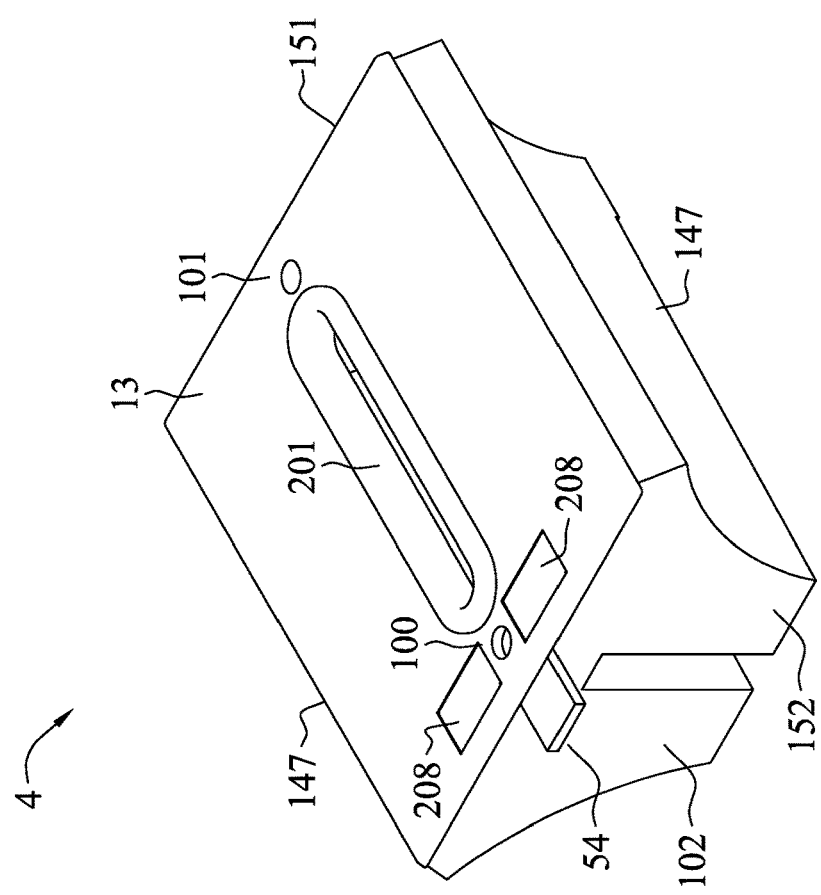
FIG. 4A is a perspective view of a supply side of a seed/plant capsule of an automated vertical plant cultivation system, in accordance with embodiments.

FIGS. 4A-4B show two perspectives of the capsules. FIG. 4A shows the capsule view from the fluid supply side and FIG. 4B shows the capsule's view from the fluid evacuation side.

FIG. 4A shows the capsule's perspective from the fluid supply side 150. The capsule's cap 13 shows the supply side mounting opening 100, the evacuation side mounting opening 101, the plant nutrient/plant health safety additive/s port/s 208 and the plant growth aperture/s 201. Extending outwardly from the cap 4, mounted on the supply side wall 152 is the capsule's power or power and data receptacle 54. The supply side wall recess 102 below receive the fluid supply riser (not shown) built-in to the supply channel inner wall (not shown). Also shown are the capsule's long side walls 147 which flares out from the capsule's bottom outwardly.

FIG. 4B shows the capsule's perspective from the fluid evacuation side. The capsule's cap 13 shows the supply side mounting opening 100, the evacuation side mounting hole 101, the plant nutrient/plant health safety additive/s port/s 208 and the plant growth aperture/s 201. Extending out and away from the cap 4, mounted on the supply side wall 152 (not shown) is the capsule's power or power and data receptacle 54. The evacuation side wall 152 shows an overflow through-bolt spout 210 extending out and away from the capsule. When the capsule's evacuation port 149 become clogged and/or the capsule's fluid sensor level 213 fail, access water inside the capsule 4 evacuates through the through-bolt spout 210. Also shown are the capsule's long side walls 147 which flare out from the capsule's bottom outwardly (not shown).

FIGS. 5A-5C show three capsule sections. FIG. 5A shows a longitudinal vertical section through the capsule's center; FIG. 5B shows a transverse section with view toward the fluid supply side wall; and FIG. 5C shows a transverse section with view toward the fluid evacuation side wall.

FIG. 5A shows the capsule's cap 13 on top of the supply side wall 152 with the seed/plant aperture 201 and mounting openings 100,101, the evacuation side wall 151 and the capsule's floor 10 sloping down from the supply side wall 152 to the evacuation side wall 151. The opening at the cap 13 includes the fluid supply side mounting opening 100, the fluid evacuation side mounting opening 101 and the plant growth aperture 201. Below the supply side mounting opening 100 inside a semi-enclosed ledge 24, the capsule's fluid inlet opening 111 is also acting as the capsule's supply side mounting port 148. Inside the capsule 4, a plant root retaining scaffolding is placed 108 (not shown) with a cavity retaining seed or seedling pouch 18 (not shown) can be placed. At the capsule's floor 10 the fluid evacuation port 149 is shown with a cylindrical screen 153 extending up to the capsule's cap 13. The screen 153 protects the fluid evacuation passage from getting clogged by organic matter. Also, through the screen 153, a fastening tool 204 (not shown) secure the capsule 4 to the magazine 3 at the capsule's fluid evacuation port 149. At the fluid evacuation side wall 192, an overflow through-bolt 210 is mounted slightly above the capsule's designed fluid level. When the fluid evacuation spout 149 becomes clogged and/or when the capsule's fluid level sensor 213 fails, excess fluid evacuates the capsule 4 through this overflow through-bolt spout 210. At the supply side wall 152, a power or power and data receptacle 54 extends outwardly. When the capsule 4 is placed in the magazine's capsule cavity 19 (not shown), the receptacle rests on the fluid supply channel cover 193 engaging the power or power and data receptacle 54.

FIG. 5B shows on top the plant growth aperture 201. At the center of the fluid supply side wall 152, the fluid riser recess 102 carves space inside the capsule 4 having semi-enclosures at both sides to retain plant nutrients and/or plant health safety additive(s) 16 in fluid, semi-solid or solid form. Above the fluid riser 103 (shown in dashed line), the capsule's fluid entry ledge 24 diverts fluid that enters the capsule 4 sideways to flow over the plant nutrients and/or plant health safety additive(s) 16. Also shown in dashed line is the seed/seedling root retaining scaffolding 203 (not shown) with a seed/seedling retaining pouch 18 (not shown).

FIG. 5C shows the cap 13 on top with the growth aperture 201. An overflow through-bolt 210 is shown mounted to the fluid evacuation side wall 192. At the floor of the capsule 10, a fluid evacuation port 149 using a through-bolt 220 (not shown). The bolt may include a self-closing aperture when the capsule 4 is removed from magazine 3. A cylindrical screen 153 is shown extending up to the capsule's cap 13. The screen 153 protects the fluid evacuation passage from getting clogged by organic matter. Also, through the screen 153, a fastening tool 204 (not shown) secures the capsule 4 to the magazine 3 at the capsule's fluid evacuation port 149.

FIGS. 6A-6C show top capsule view and partial vertical sections. FIG. 6A shows the top capsule view without the cap; FIG. 6B shows a section through the capsule's fluid supply riser; and FIG. 6C shows a section through the fluid evacuation port.

FIG. 6A shows the capsule's 4 view from the top without the cap 13. At the fluid supply side wall 152, the power or power and data receptacle 54 is shown extending out. At the opposite side of the wall, the capsule's fluid supply inlet opening 111 is shown at the center of an elevated ledge 24. The opening also provides a mounting connectivity in the capsules at the fluid supply side. On both sides of the elevated ledge 24 semi-enclosed spaces retain plant nutrient and/or plant health protection additives 16. A seedling/plant root retaining scaffolding 203 is shown with a recess to retain a seed/seeding pouch 18 stretching the entire length of the capsule 4. At the fluid evacuation side wall 151, an overflow through-bolt 210 extends outwardly from the capsule's wall. Next to it, inside the capsule 4, a cylindrical screen 153 extends downwardly to the capsule's floor 10 protecting the fluid evacuation port 149 at its center below from clogging. The port 149 also provides the capsule's 4 mounting connectivity point to the magazine 3 at the fluid evacuation side 151.

FIG. 6B shows an enlarged section of the fluid supply side fluid entry ledge 24 with the capsule's mounting tool 204 in position to connect the capsule 4 to the magazine.

FIG. 6C shows an enlarged section of the fluid evacuation side evacuation port 149 with the capsule's mounting tool 204 in position to the capsule 4 to the magazine 3.

FIG. 7 shows a transverse section of the magazine through the longitudinal center of a capsule 4. The supply channel 206 is enclosed by the supply channel external wall 98, the supply channel inner wall 99, the supply channel floor 95 and at the top, the supply channel cover 193. The supply channel cover 193 contains embedded power or power and data conductors 230 and receptacle 224. In this embodiment, a memory device 231 mounted on or in vicinity of the capsule's receptacle 224 communicates data about the capsule 4 and/or its content to a processor 243. Below the supply channel floor 97, the fluid supply "U" coupler 90 conveys fluid into the fluid supply riser 103 built into the supply channel inner wall 99. Fluid egressing into the capsule 4 through the capsule's fluid supply opening 148 flows down into the capsule's enclosure 146. FIGS. 5a, 6b, and 5c describe the fluid flow inside the capsule embodiment. The fluid exits the capsule 4 through the capsule's fluid evacuation port 149 and travels through the fluid evacuation "U" coupler 91 into the fluid evacuation channel 205. The fluid evacuation channel 205 is enclosed by the evacuation channel exterior wall 96, the channel interior wall 97, the evacuation channel floor 94, and at the top, the evacuation channel cover 194. The evacuation channel cover 194 contains embedded power or power and data conductors 230 and receptacles 224. In this embodiment, an overflow through-bolt spout 210 is shown mounted to the capsule's evacuation side end wall 192 passing through a notched opening in the evacuation channel inner wall 97 with the spout position ending inside and over the evacuation channel 205.

Figure 8:
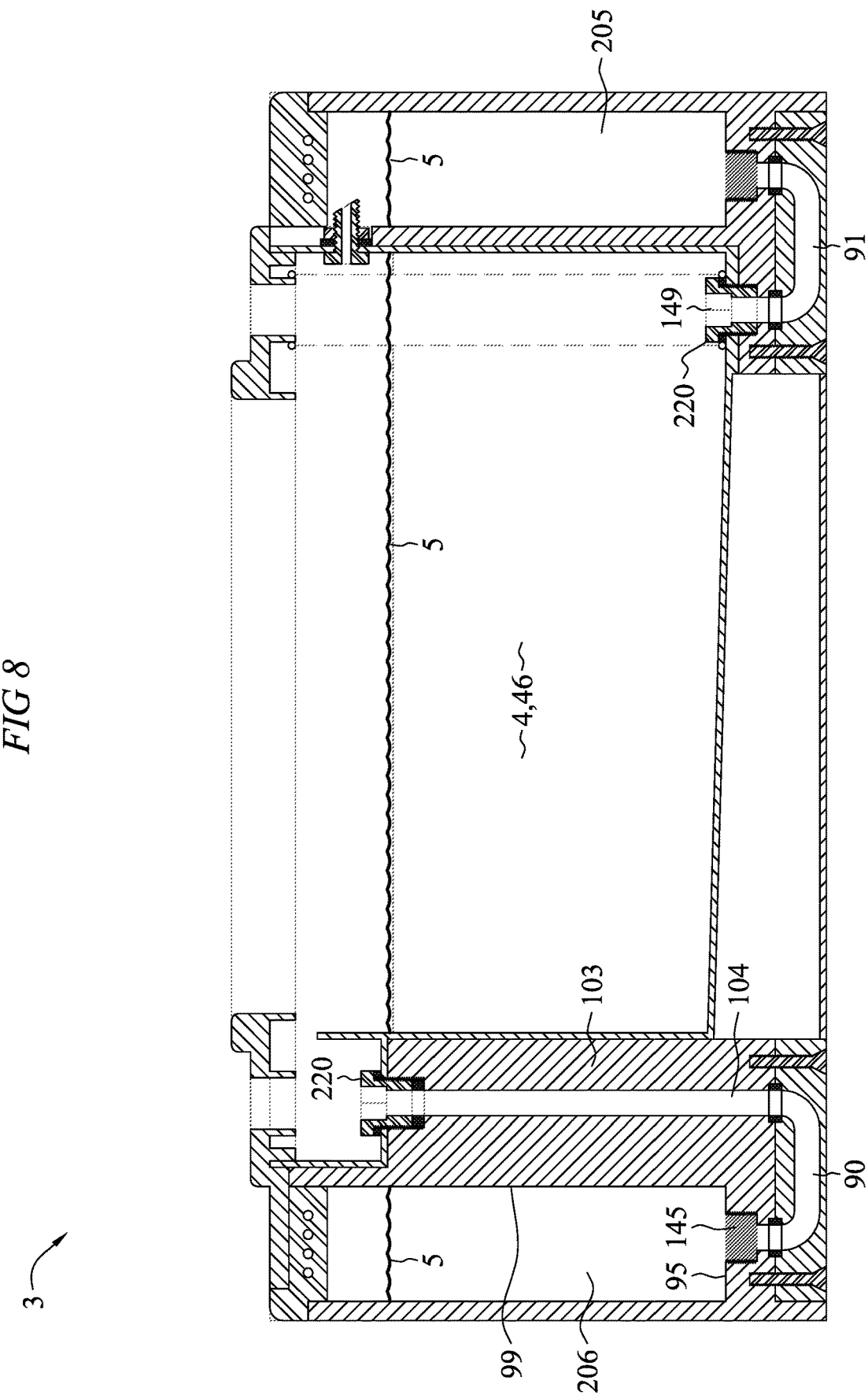
FIG. 8 is a section view of a magazine with a seed/plant capsule of an automated vertical plant cultivation system configured for hydroponic plant cultivation, in accordance with embodiments.

FIG. 8 shows a transverse section through the magazine with a capsule suited for a hydroponic plant cultivation method. The fluid 5 entering the magazine's 3 supply channel 206 is controlled by at least one valve 11. At the supply channel 206 the fluid 5 is distributed at the supply channel capsule ports 145 located at the floor of the supply channel 95. The fluid flows through the supply "U" coupler 90 rising through a bore 104 in the supply riser 103 descending into the capsule 4. The supply riser is a built-in protrusion in the fluid supply channel inner wall 99. Fluid entering the capsule 4 flows downwardly filling the capsule's enclosure 46 while a portion of the fluid evacuates the capsule through the capsule's fluid evacuation port 149 traveling through the evacuation "U" coupler 91 into the fluid evacuation channel 205. The through-bolt 220 (not shown) at the capsule's fluid evacuation port and/or the "U" coupler 91 may include a self-closing aperture when the capsule 4 is removed from magazine 3. The evacuation channel fluid magazine's egress is controlled by at least one valve 11 (not shown). By employing gate valves 11 at the magazine's 3 supply and evacuation channels and fluid level sensor/s 213 (not shown) placed in the channel/s, capsule/s or both, the channels and all magazine's capsules 4 can maintain uniform fluid levels when the magazine 3 is plumb.

Figure 9:
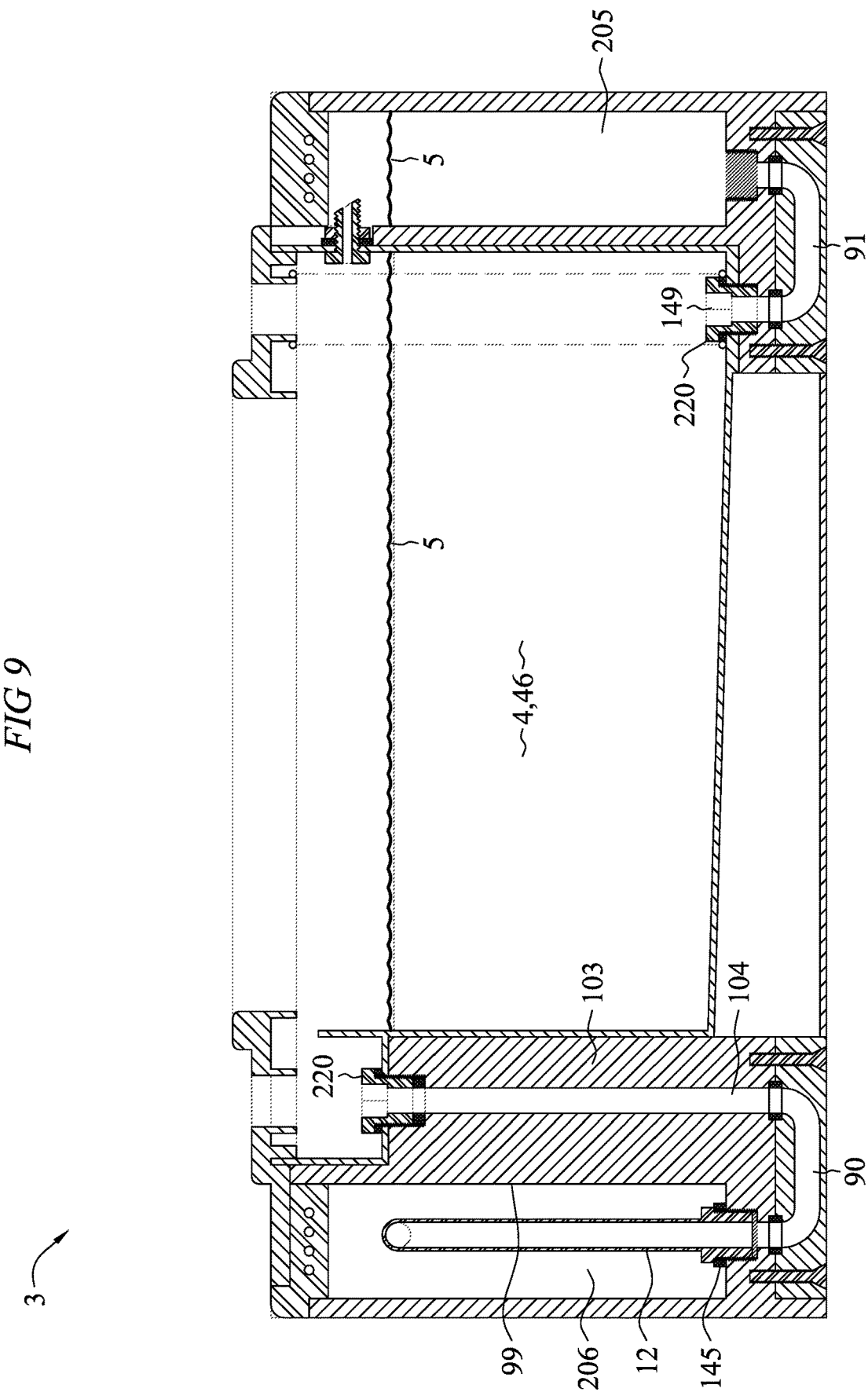
FIG. 9 is a section view of a magazine with a seed/plant capsule of an automated vertical plant cultivation system configured for hydroponic plant cultivation, in accordance with embodiments.

FIG. 9 shows a transverse section through the magazine with a capsule suited for a hydroponic plant cultivation method. The fluid 5 entering the magazine's supply channel 206 is controlled by a multi-channel valve 35. Dedicated capsule supply pipe/s 12 connected at one end to the multi-channel valve 35 ports and on the other end to channel's capsule fluid supply ports 145 flow fluid to all capsules 4. The fluid flows from the capsule's supply ports 145 through the supply "U" coupler 90 rising through a bore 104 in the supply riser 103 descending into the capsule 4. The supply stand is a built-in protrusion in the fluid supply channel inner wall 99. Fluid entering the capsule 4 flows downwardly filling the capsule's enclosure 46 while a portion of the fluid evacuates the capsule through the capsule's fluid evacuation port 149 traveling through the evacuation "U" coupler 91 into the fluid evacuation channel 205. The through-bolt 220 (not shown) at the capsule's fluid evacuation port and/or the "U" coupler 91 may include a self-closing aperture when the capsule 4 is removed from magazine 3. The evacuation channel fluid magazine's egress is controlled by at least one valve 11. By employing gate valves 11 at the magazine's 3 supply and evacuation channels and fluid level sensor/s 213 (not shown) placed in the channel/s, capsule/s or both, the channels and all magazine's capsules 4 can maintain uniform fluid levels when the magazine 3 is plumb.

Figure 10:
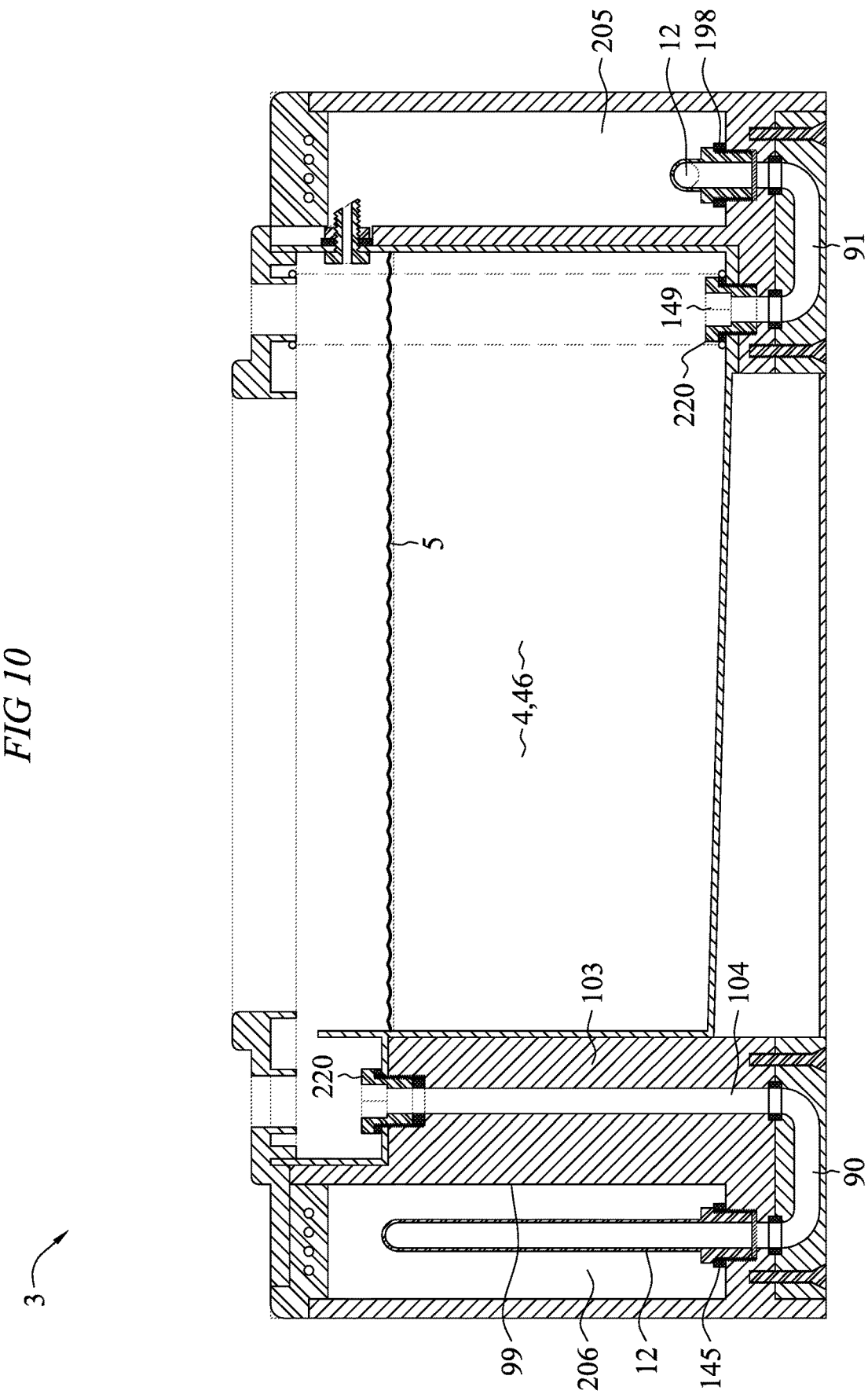
FIG. 10 is a section view of a magazine with a seed/plant capsule of an automated vertical plant cultivation system configured for hydroponic plant cultivation, in accordance with embodiments.

FIG. 10 shows a transverse section through the magazine with a capsule suited for a hydroponic plant cultivation method. The fluid 5 entering the magazine's supply channel 206 is controlled by a multi-channel valve 35. Dedicated Supply pipe/s 12 connected at one end to the multi-channel valve 35 ports and on the other end to channel's capsule supply ports 145 deliver fluid to all capsules 4. The fluid flows from the capsule's fluid supply ports 145 through the supply "U" coupler 90 rising through a bore 104 in the supply riser 103 descending into the capsule 4. The supply riser is a built-in protrusion in the fluid supply channel inner wall 99. Fluid entering the capsule 4 flows downwardly filling the capsule's enclosure 46 while a portion of the fluid evacuates the capsule through the capsule's fluid evacuation port 149 traveling through the evacuation "U" coupler 91 into the evacuation channel capsule's port 198 inside the fluid evacuation channel 205. The through-bolt 220 (not shown) at the capsule's fluid evacuation port and/or the "U" coupler 91 may include a self-closing aperture when the capsule 4 is removed from magazine 3. The evacuation channel fluid magazine's egress is controlled by at least one valve 11 (not shown). By employing gate valves 11 at the magazine's 3 supply and evacuation channels and fluid level sensor/s 213 (not shown) placed in the channel/s, capsule/s or both, the channels and all magazine's capsules 4 can maintain uniform fluid levels when the magazine 3 is plumb.

Figure 11:
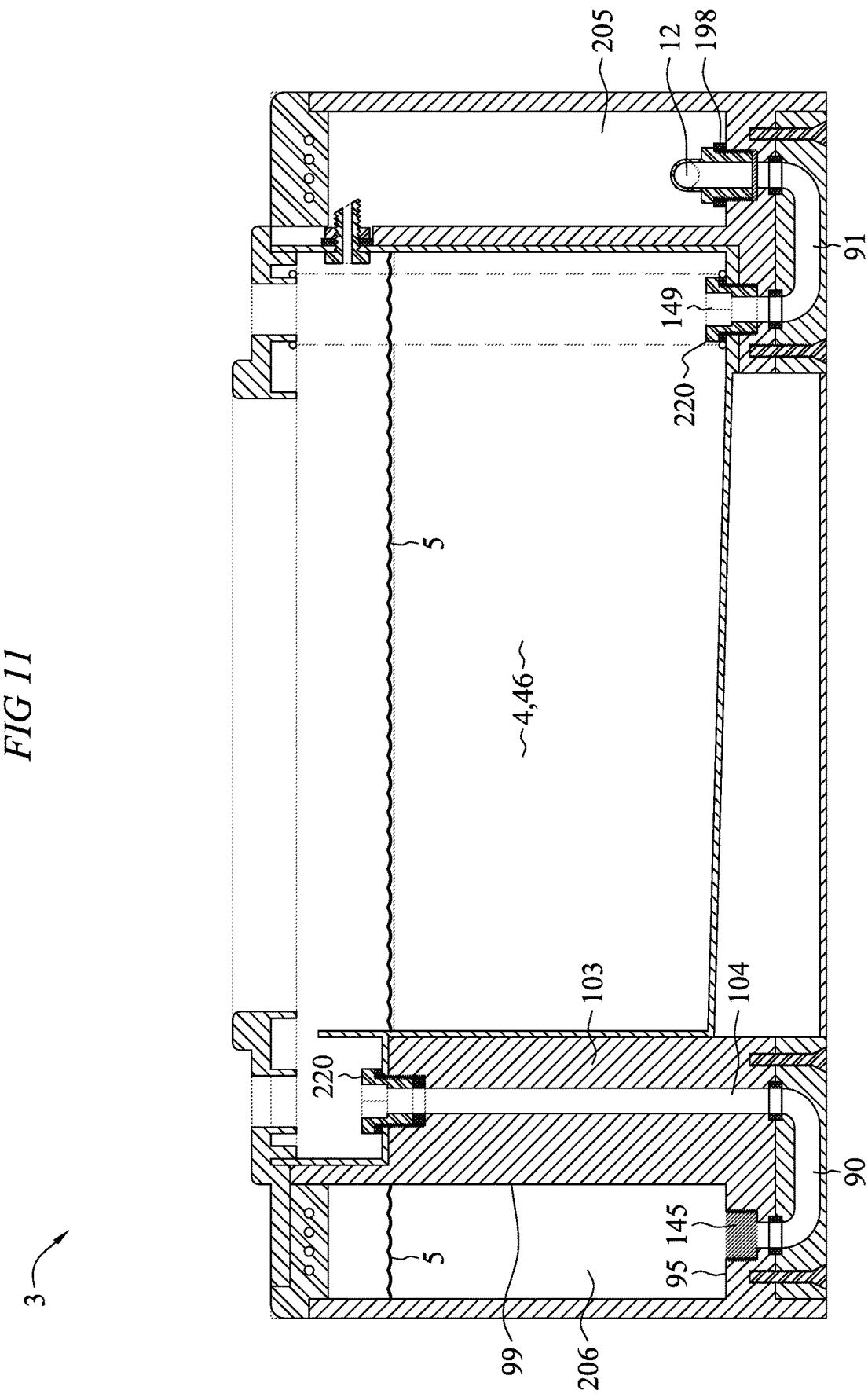
FIG. 11 is a section view of a magazine with a seed/plant capsule of an automated vertical plant cultivation system configured for hydroponic plant cultivation, in accordance with embodiments.

FIG. 11 shows a transverse section through the magazine with a capsule suited for a hydroponic plant cultivation method. Fluid 5 enters the magazine's 3 supply channel 206 is controlled by at least one valve 11. At the supply channel 206 the fluid 6 is distributed at the supply channel's capsule supply ports 145 located at the floor of the supply channel 95. The fluid flows through the supply "U" coupler 90, rising through a bore 104 in the supply riser 103 descending into the capsule 4. The supply stand is a built-in protrusion in the fluid supply channel inner wall 99. Fluid entering the capsule 4 flows downwardly filling the capsule's enclosure 46 while a portion of the fluid evacuates the capsule through the capsule's fluid evacuation port 149 traveling through the evacuation "U" coupler 91 into the evacuation channel capsule's port 198 inside the fluid evacuation channel 205. The through-bolt 220 (not shown) at the capsule's fluid evacuation port and/or the "U" coupler 91 may include a self-closing aperture when the capsule 4 is removed from magazine 3. The evacuation channel fluid magazine's egress is controlled by at least one valve 11 (not shown). By employing gate valves 11 at the magazine's 3 supply and evacuation channels and fluid level sensor/s 213 (not shown) placed in the channel/s, capsule/s or both, the channels and all magazine's capsules 4 can maintain uniform fluid levels when the magazine 3 is plumb.

FIG. 12 shows an enlarged partial view of the magazine 3 bottom with a capsule 4 (not shown) nestled inside the magazine's capsule cavity 19 (not shown) with concealed light source 65 device/s mounted inside reflectors 56 with the reflectors' up-light apertures 55 also acting as heat dissipating vents 64 above. A fluid supply "U" coupler 90 is shown conveying fluid from the supply channel 205 above, to bored riser (not shown) into the capsule 4. At the capsule's opposite end below the evacuation channel 205 a fluid evacuation "U" coupler 91 conveys fluid from inside the capsule 4 into the evacuation channel 205 and out from the magazine.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A plant cultivation system comprising:
   a processor;
   a magazine; and a plurality of detachable seed/plant capsules retained within seed/plant reservoirs of the magazine, wherein each seed/plant capsule comprises:
a substantially enclosed moisture-proof enclosure;
at least one dedicated fluid supply port disposed within the enclosure;
at least one dedicated fluid evacuation port disposed in proximity or coupled to a bottom of the enclosure; and
a coupled electronic memory device containing seed/plant capsule authentication information, wherein:
the information contained in the electronic memory device is transmitted to the processor in response to coupling the seed/plant capsule within a corresponding seed/plant reservoir of the magazine and wherein the processor, upon authentication, joins the seed/plant capsule to a cultivation system network of devices.

2. The system of claim 1, wherein an electronic identifier and/or a mechanical key is coupled with the seed/plant capsule.

3. The system of claim 1, wherein the electronic memory device transmits to the processor information of the seed/plant capsule, comprising at least one of:
a. Date of manufacturing,
b. Plant species contained,
c. Seed batch data,
d. Seed age,
e. Plant growing parameters.

4. The system of claim 1, wherein the processor operates the network of devices in accordance with specific growth needs of the seed/plant capsule contents.

5. The system of claim 1, wherein the processor provides local or local and remote alerts about anomalies detected in the operation or the operation and the health of the seed/plant capsule contents.

6. The system of claim 1, wherein the processor identifies a specific location of the seed/plant capsule in the magazine, the location of the magazine within a plurality of magazines, or combinations thereof.

7. The system of claim 1, further comprising a thermally sensitive indicator that displays an operational fitness of the seed/plant capsule to be deployed.

8. The system of claim 1, wherein the processor is communicatively coupled to a wireless and/or wired communication device.

9. The system of claim 1, wherein at least one valve coupling the seed/plant capsule to the magazine is configured to prevent fluid back flow.

10. The system of claim 1, wherein at least one self-closing aperture coupled to the seed/plant capsule is configured to prevent fluid spillage upon disengagement from the magazine.

11. The system of claim 1, wherein the electronic memory device is coupled or nearby an electrical receptacle.

12. The system of claim 1, wherein the electronic memory device coupled to the seed/planter capsule memory device has sensing and processing capability.

13. The system of claim 1, wherein the electronic memory device coupled to a capsule contains information about pre-determined life duration of the plant material inside.

14. The system of claim 1, wherein the seed/plant capsule internal element/s is/are factory pre-configured to be operated by the processor in accordance with a specific irrigation method.

15. The system of claim 1, wherein the processor can control fluid supply to least two seed/plants capsules inside a magazine jointly and separately.

* * * * *